United States Patent
Onohara et al.

[11] Patent Number: 5,520,259
[45] Date of Patent: May 28, 1996

[54] SUPPORTING STRUCTURE FOR AN OPERATOR CABIN ON CONSTRUCTION EQUIPMENT

[75] Inventors: Kazuyuki Onohara; Hiroshi Itogawa; Koji Okazawa, all of Hirakata, Japan

[73] Assignee: Kabushiki Kaisha Komatsu Seisakusho, Tokyo, Japan

[21] Appl. No.: 197,694

[22] Filed: Feb. 17, 1994

[30] Foreign Application Priority Data

Feb. 22, 1993 [JP] Japan .................. 5-011754 U

[51] Int. Cl.$^6$ .................................................. B62D 33/10
[52] U.S. Cl. ........................................ 180/89.12; 180/89.15
[58] Field of Search .............................. 180/89.12, 89.14, 180/89.15; 296/190, 35.1; 188/267, 320.11; 267/221, 226, 224, 225, 140.13, 140.11

[56] References Cited

U.S. PATENT DOCUMENTS

| | | | |
|---|---|---|---|
| 1,303,950 | 5/1919 | O'Connor | 267/226 |
| 3,147,966 | 9/1964 | Axthammer et al. | 280/708 |
| 4,921,049 | 5/1990 | Kaiser | 267/140.13 |
| 4,989,684 | 2/1991 | Conaway | 180/89.15 |
| 4,998,592 | 3/1991 | Londt | 180/89.12 |
| 5,209,460 | 5/1993 | Bouhours et al. | 267/140.13 |

FOREIGN PATENT DOCUMENTS

| | | | |
|---|---|---|---|
| 99526 | 2/1984 | European Pat. Off. | 296/190 |
| 3902269 | 8/1990 | Germany | 180/321.11 |
| 151408 | 9/1982 | Japan | 188/321.11 |
| 59-67178 | 4/1984 | Japan | 296/190 |
| 60-148368 | 10/1985 | Japan . | |
| 62-185761 | 11/1987 | Japan . | |
| 2-45881 | 3/1990 | Japan . | |
| 77373 | 3/1990 | Japan | 180/89.12 |
| 279479 | 11/1969 | U.S.S.R. | 180/89.12 |
| WO93/09302 | 5/1993 | WIPO . | |

*Primary Examiner*—Karin L. Tyson
*Attorney, Agent, or Firm*—Richards, Medlock & Andrews

[57] ABSTRACT

An operator cabin on construction equipment is provided with a supporting structure which improves the riding quality by absorbing and damping vibrations and large impacts transmitted to the operator cabin. The right and left side portions of a front portion of the operator cabin (1) are secured to a frame (3) of the body of the construction equipment through damper plate shock absorbers (10R, 10L) or rotatable mounts (30R, 30L), while the right and left side portions of a rear portion of the operator cabin (1) are secured to the frame (3) through spring biased hydraulic shock absorbers (20L, 20R). Each of the shock absorbers has a vibration damping function. In particular, the stroke of the spring biased hydraulic shock absorber is large enough to absorb a large impact energy. This makes it possible to absorb vibration of small amplitude. For a strong shock, the impact energy can be absorbed by oscillating the operator cabin (1) about a pivot axis through the front mounts, allowing damping of the vibration. Lateral oscillation can be minimized by a four-bar parallel linkage which includes upper and lower lateral bars (40a, 40b), one cabin side (1R), and a vertical bracket (4R) positioned adjacent to that cabin side (1R).

20 Claims, 5 Drawing Sheets

SUPPORTING STRUCTURE FOR AN OPERATOR CABIN ON CONSTRUCTION EQUIPMENT

FIELD OF THE INVENTION

This invention relates to a supporting structure for an operator cabin on a construction equipment, e.g. a bulldozer. In a particular aspect, the invention relates to a structure for mounting an operator cabin on the frame of a mobile construction equipment and for dampening the vibrations traveling through the frame to the operator cabin.

BACKGROUND OF THE INVENTION

Figure 9A:
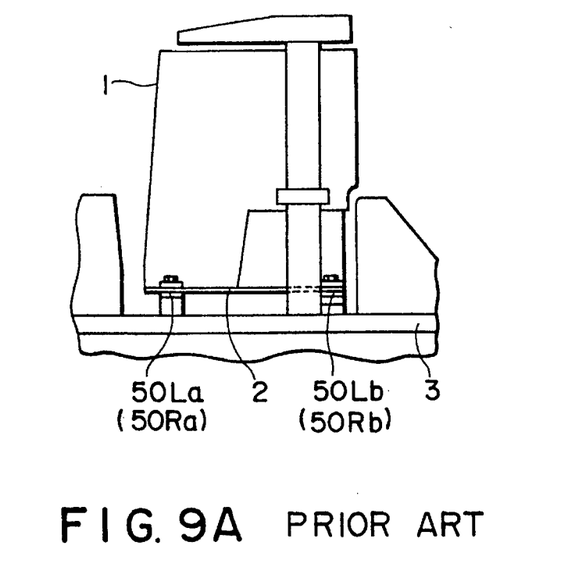
FIG. 9A is a side view of a conventional supporting structure for a cabin.
Figure 9B:
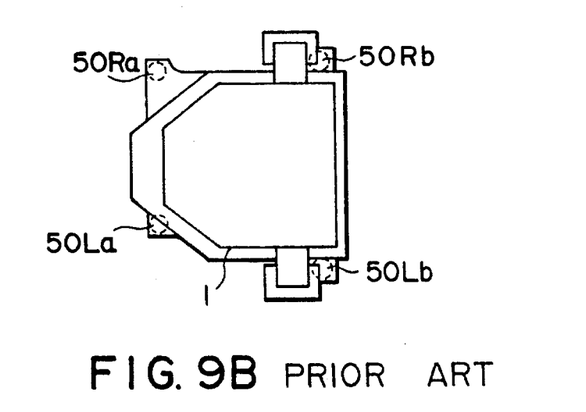
FIG. 9B is a plan view of the supporting structure shown in FIG. 9A.

Elastic mounts have been used as devices to support an operator compartment or cabin (hereinafter referred to as a cabin) on a body of mobile construction equipment, such as a bulldozer, in order to improve the riding quality for the operator. As shown in FIGS. 9A and 9B, a floor 2 of a cabin 1 is secured to a frame 3 of the body of the mobile construction equipment through four elastic mounts 50La, 50Lb, 50Ra and 50Rb.

Figure 9C:
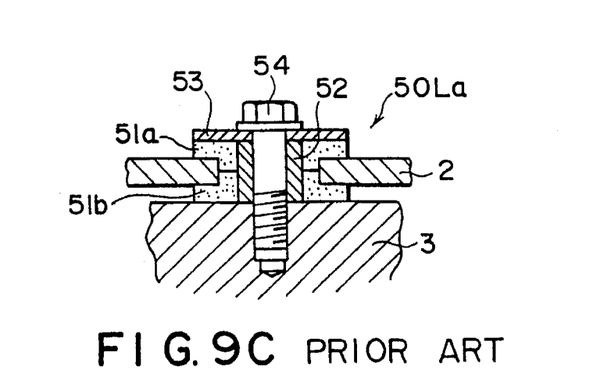
FIG. 9C is an enlarged sectional view of an elastic mount shown in FIG. 9A.

A cross-section of the elastic mount 50La is shown in FIG. 9C as an example of the construction of the four elastic mounts 50La, 50Lb, 50Ra and 50Rb. Annular rubber members 51a and 51b are disposed about a tubular spacer 52 with rubber members 51a and 51b being located on the top and bottom sides, respectively, of the floor 2 with the outer diameter of the spacer 52 being less than the diameter of the opening in floor 2 through which the spacer 52 extends, so that the spacer 52 does not directly contact the floor 2. The rubber members 51a and 51b are tightly attached to the frame 3 by a bolt 54 extending through a holding plate 53 and the spacer 52 into the frame 3. Vibrations generated on the body frame 3 are at least partially absorbed by the rubber members 51a and 51b so as to substantially dampen the vibrations traveling to the cabin 1, thereby improving the riding quality.

However, the rubber utilized for the elastic mounts 50La, 50Lb, 50Ra, and 50Rb is generally a hard rubber having a large spring constant in order to improve the durability of the rubber members 51a and 51b. Accordingly, such elastic mounts are insufficient for absorbing large amplitude vibrations and shock. This makes the construction equipment uncomfortable to ride and causes early fatigue of an operator, which degrades working efficiency. At the same time, the use of hard rubber elastic mounts permits the formation of cracks and failures in the structure of cabin 1. In order to counter these problems, damper plate shock absorbers (viscous mount) having a smaller spring constant may be used in place of the elastic mounts 50La, 50Lb, 50Ra, and 50Rb. However, such viscous mounts are still insufficient for absorbing the shock caused to a bulldozer upon passing over a large rock or the like.

On the other hand, a flexible supporting structure having a small spring constant can be used effectively for absorbing the vibration and the shock. However, the cabin 1 may experience excessive oscillation upon the equipment passing over a large rock. A resulting lateral oscillation can result in interference between the cabin peripheral members and the frame 3, as well as in erroneous or incorrect operation of control levers located in the cabin 1.

SUMMARY OF THE INVENTION

An object of the present invention is to avoid or at least minimize the above mentioned problems. Another object of the invention is to provide a mounting structure for supporting an operator cabin on the body of a mobile construction equipment with the mounting structure being capable of sufficiently absorbing vibration and shock generated on the body of the construction equipment, while causing less lateral oscillation.

According to the present invention, a mobile construction equipment is provided with a supporting structure to secure the operator cabin while absorbing vibration in the construction equipment traveling toward the operator cabin.

In a first embodiment of the invention, the operator cabin is secured to the frame of the construction equipment through damper plate shock absorbers located at the right and left side portions of a front portion of the operator cabin and through spring biased hydraulic shock absorbers located at the right and left side portions of a rear portion of the operator cabin. Each damping plate shock absorber comprises a guide shaft joined through an elastic material to a case, with one of the guide shaft and the case being tightly attached to the frame and the other of the guide shaft and the case being secured to the cabin. One end of the guide shaft is tightly attached to one of the frame and the operator cabin, while the other end of the guide shaft is provided with a damper plate tightly attached thereto. The damper plate is positioned within a highly viscous fluid hermetically contained in a fluid enclosing chamber in the nose of the case.

Each of the spring biased hydraulic shock absorbers comprises a cylinder and a piston rod. The piston rod has an inner end and a distal end, while the cylinder has an attachment end and a piston end. One of the attachment end of the cylinder and the distal end of the piston rod is tightly attached to the operator cabin, with the other of the attachment end of the cylinder and the distal end of the piston rod being attached to the construction equipment frame. A gas chamber is provided within the cylinder into which the inner end of the piston rod is inserted. Oil chambers are also provided within the cylinder and are separated from each other by a piston fixedly secured to the piston rod. The piston rod is biased in one direction by a spring.

In a second embodiment of the invention, the operator cabin is rotatably mounted to the frame at the right and left side portions of the front portion of the cabin through rotatable supporting members, respectively. The cabin is supported by spring biased hydraulic shock absorbers at the right and left side portions, respectively, of the rear portion of the cabin. In addition, one side of the cabin and one bracket fixed to the frame are so connected to each other as to form a four-bar parallel linkage with lateral rods disposed as the upper and lower portions of the linkage. One end of each lateral rod is rotatably mounted by a pivot pin to the operator cabin and the other end of each lateral rod is rotatably mounted to the frame bracket by a pivot pin. An elastic bushing is interposed between each rod and each pivot pin.

In these embodiments, the damper plate shock absorbers or the spring biased hydraulic shock absorbers have a vibration damping function. In particular, the stroke of the spring biased hydraulic shock absorbers is large enough to absorb a large impact energy. This makes it possible to absorb vibrations of small amplitude. For a strong shock, the impact energy can be absorbed by oscillating the operator cabin about a pivot axis adjacent to the front portion of the operator cabin floor, allowing damping of the vibrations while minimizing the disturbances to the operator's vision. Lateral oscillation of the operator cabin in response to vertical movement of the mobile construction equipment is minimized, so that an operator feels comfortable riding in the cabin.

DESCRIPTION OF THE PREFERRED EMBODIMENTS

A first embodiment of the present invention is now described with reference to FIGS. 1 through 4.

Figure 1:
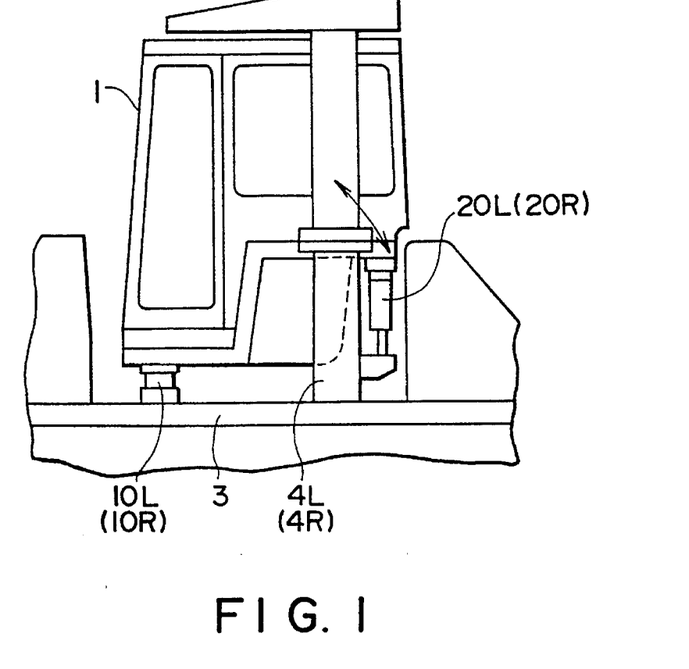
FIG. 1 is a side view of a vibration damping supporting structure for a cabin according to a first embodiment of the present invention.
Figure 2:
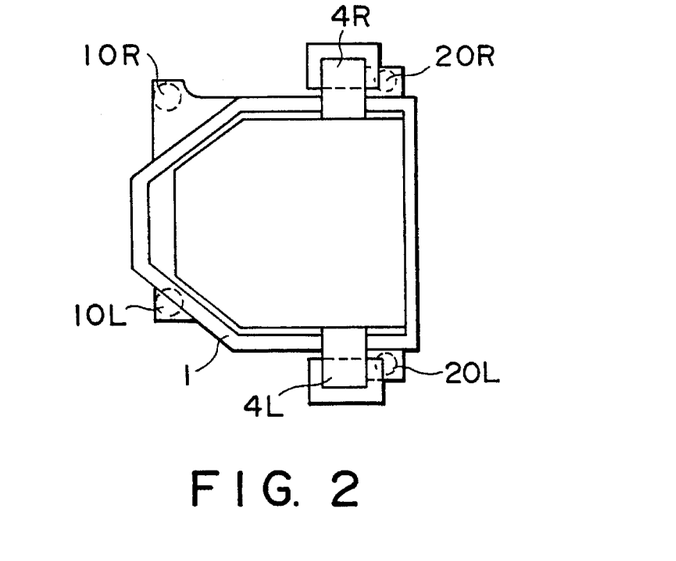
FIG. 2 is a plan view of the vibration damping supporting structure shown in FIG. 1.

As shown in FIGS. 1 and 2, each of the right and left side portions of a front portion of the cabin 1 is secured to the frame 3 of the body of the construction equipment through viscous mounts 10R and 10L, respectively, which are positioned on the frame 3 at right side and left side locations beneath and adjacent to the front portion of the cabin 1. Each of the viscous mounts 10R and 10L serves as a damper plate shock absorber. Each of the right and left side portions of a rear portion of the cabin 1 is secured to the corresponding brackets 4R and 4L through suspension cylinders 20R and 20L, respectively. Each of the suspension cylinders 20R and 20L extends generally vertically between the respective bracket 4R and 4L and the cabin 1, and serves as an oil spring enclosed shock absorber. The brackets 4L and 4R are secured to the frame 3 by any suitable means.

Figure 3:
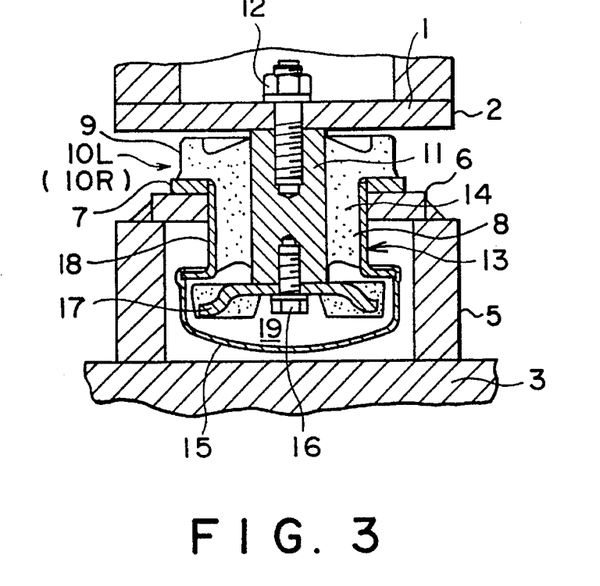
FIG. 3 is an enlarged sectional view of a front supporting viscous mount shown in FIG. 1.

Each of the viscous mounts 10R and 10L can be structured as shown in FIG. 3. Each viscous mount 10R, 10L comprises a generally vertically positioned guide shaft 11, a case 13, and an elastic member 14. The upper end of the guide shaft 11 is tightly secured by bolt 12 to the underside of the floor 2 of the cabin 1. The case 13 is positioned within the housing formed by tubular member 5 and annular flange 6. The lower end of tubular member 5 is secured to frame 3 by any suitable means, e.g. by welding, while the flange 6 is secured to the upper end of the tubular member 5 by any suitable means, e.g. by welding. The case 13 is in the form of a generally cylindrical annular wall 18 provided with a dome end member 15 at its lower end forming a fluid enclosing chamber 19. The cylindrical wall 18 extends through the opening in annular flange 6, with the upper end of the cylindrical wall 18 being attached to a ring member 7 positioned on top of flange 6. A damper plate 17 is contained in the fluid enclosing chamber 19 and is tightly attached to the lower end of the guide shaft 11 by a bolt 16. In addition, a highly viscous damping fluid is hermetically contained in the fluid enclosing chamber 19 so as to dampen the movement of guide shaft 11. The elastic member 14 is in the form of a cylindrical annular portion 8, positioned between and in contact with guide shaft 11 and cylindrical wall 18, and an annular flange portion 9 extending outwardly from the upper end of the cylindrical annular portion 8. The flange portion 9 of the elastic member 14 is positioned between the lower surface of the floor 2 of cabin 1 and the upper surface of the ring member 7. Thus, the upper end of the case 13 is firmly supported by the housing formed by the cylindrical wall 5 and the annular flange 6, and thus is stationary with respect to the frame 3. The front portion of the cabin 1 is resiliently supported by the elastic member 14 positioned between the floor 2 and the ring member 7, with the flexibility of the elastic member 14 being modified by the viscous fluid in chamber 19 dampening any movement of damper plate 17 and guide shaft 11.

When the frame 3 vibrates upwardly and downwardly, small amplitude vibrations are absorbed by the rubber member 14. Vibrations of larger amplitude are dampened by the damper plate 17, allowing absorption of the vibrations before the vibrations reach the floor 2 of the cabin 1.

Figure 4:
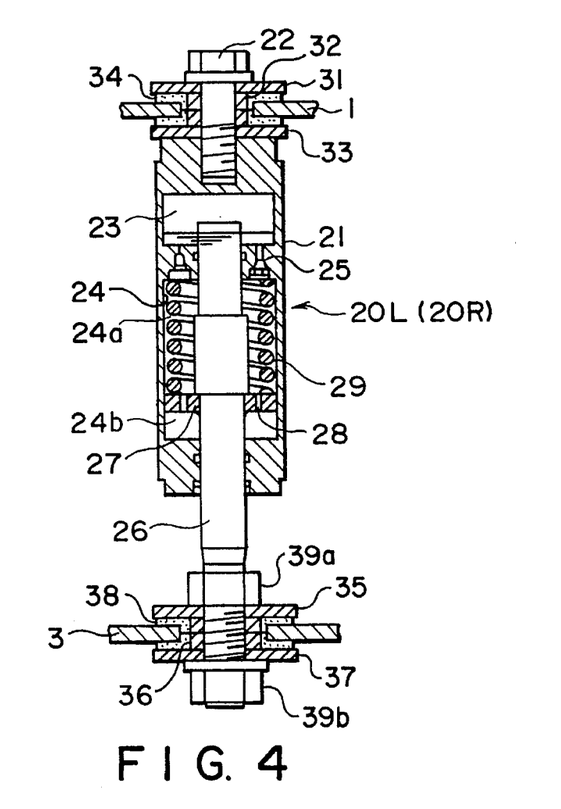
FIG. 4 is an enlarged sectional view of a rear supporting suspension cylinder shown in FIG. 1.

Each of the rear suspensions 20R and 20L can be structured as shown in FIG. 4, wherein one end of the cylinder housing 21 is tightly attached to the cabin 1 by a bolt 22 which extends through openings in plate 31, spacer 32, and plate 33 into the end of cylinder housing 21. Spacer 32 is positioned in an opening in a member of cabin 1, with the outer diameter of the spacer 32 being smaller than the opening in the cabin member 1 so that the spacer 32 does not contact the cabin member 1. An annular elastic member 34 is positioned between spacer 32 and cabin member 1 as well as between the cabin member 1 and each of plates 31 and 32.

An air chamber 23 is provided within the cylinder housing 21. The cylinder 21 is also provided with a piston chamber 24 which is divided into oil chambers 24a and 24b by an annular piston 27 positioned about and secured to a piston rod 26. The piston rod 26 and piston 27 are positioned within and coaxial to the piston chamber 24 for reciprocating motion along the generally vertically extending longitudinal axis of the piston chamber 24 with the inner end of piston rod 26 extending into air chamber 23 and being exposed to the gas pressure in air chamber 23. At least one orifice 25 is provided in cylinder housing 21 to provide restricted communication between oil chamber 24a and air chamber 23. The piston 27 is provided with at least one orifice 28 formed therethrough to provide restricted communication between the oil chambers 24a and 24b. The piston 27 is biased toward oil chamber 24b by a spring 29 which is positioned in oil chamber 24a about and coaxially with the piston rod 26, so that the cylinder 20L (20R) is normally in a partially extended position. The housing 21 can contain suitable means for providing seals between the housing 21 and the piston rod 26 to prevent leakage of the oil from the cylinder 20L (20R).

The lower end of the piston rod 26 extends through openings in plate 35, spacer 36, and plate 37, with these elements being secured to the piston rod 26 by nuts 39a and 39b. Spacer 36 is positioned in an opening in a member of frame 3, with the outer diameter of the spacer 36 being smaller than the opening in the frame member 3 so that the spacer 36 does not contact the frame member 3. An annular elastic member 38 is positioned between spacer 36 and frame member 3 as well as between the frame member 3 and each of plates 35 and 36.

When the frame 3 vibrates upwardly, the piston 27 compresses the oil within the oil chamber 24a as the piston rod 26 is forced upwardly. The compressed oil flows from oil chamber 24a into the oil chamber 24b through the orifices 28, serving as a damper due to the resistance to the oil flow, which is determined by the viscosity of the oil and the number and diameter of the orifices 28. On the other hand, when the frame 3 vibrates downwardly, the piston 27 compresses the oil within the oil chamber 24b as the piston rod 26 is forced downwardly. The compressed oil flows from chamber 24b into the oil chamber 24a through the orifices 28, with the restriction to oil flow again acting as a damper. A stroke of the suspension cylinders 20L and 20R is significantly larger than the stroke of the viscous mounts 10L and 10R. The suspension cylinders 20L and 20R are thus adapted to absorb a large impact energy.

As illustrated in FIGS. 1 and 4, the cylinders 20L and 20R are positioned in a generally vertical orientation, with the upper end of housing 21 being secured to a cabin member 1 and the distal or lower end of the piston rod 26 being secured to a frame member 3 at a point below the upper end of the housing 21. However, the distal end of piston rod 26 could be secured to a cabin member 1 while the opposite end of housing 21 could be secured to a cabin member 1 with the oil chambers 24a and 24b and the air chamber 23 being relocated accordingly. While the upper connection is illustrated as being to the cabin member 1 and the lower connection is illustrated as being to the frame member 3, the upper connection could be to a vertical component of the frame 3 at a location above the lower connection to a lower portion of the cabin 1.

The operation of the first embodiment is as follows. When the frame 3 is vibrated upwardly and downwardly, the viscous mounts 10L and 10R as well as the suspension cylinders 20L and 20R absorb and dampen the vibration in an approximately uniform manner if the amplitude of the vibration is small as in a normal driving operation. Only the damped vibration is transmitted to the cabin 1. When the equipment body passes over a large rock or the like and a strong shock is caused in the vertical direction, the suspension cylinders 20L and 20R contract and extend at a high degree. The large impact energy transmitted to the cabin 1 is dampened by the cabin 1 oscillating back and forth with the viscous dampers 10L and 10R as the center of oscillation as depicted by an arrow in FIG. 1. The vibration is dampened by the dampening effect of the viscous mounts 10L and 10R and by the dampening effect of the suspension cylinders 20L and 20R.

Figure 5:
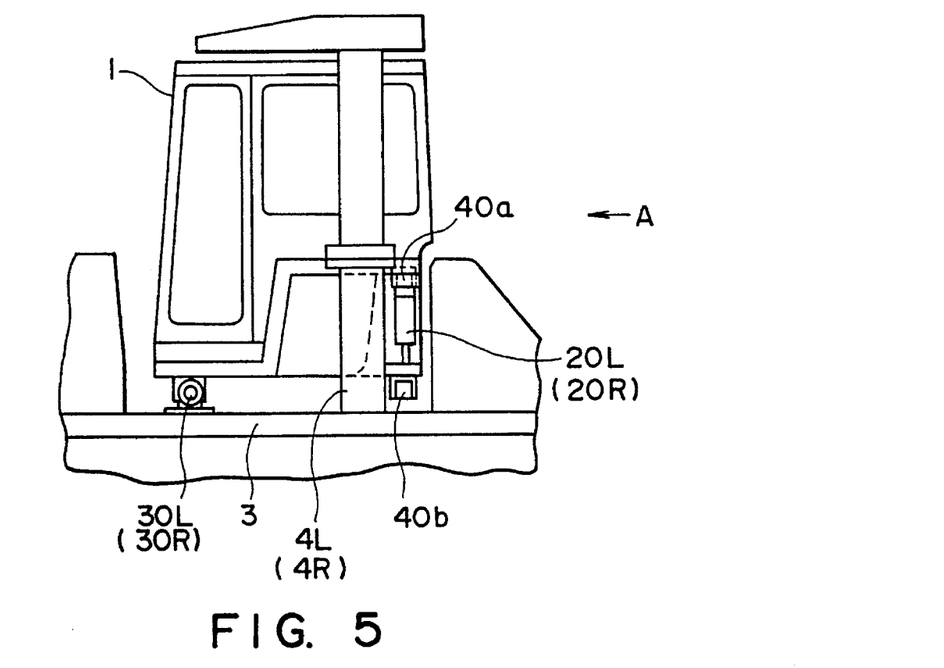
FIG. 5 is a side view of a vibration damping supporting structure for a cabin according to a second embodiment of the present invention.
Figure 6:
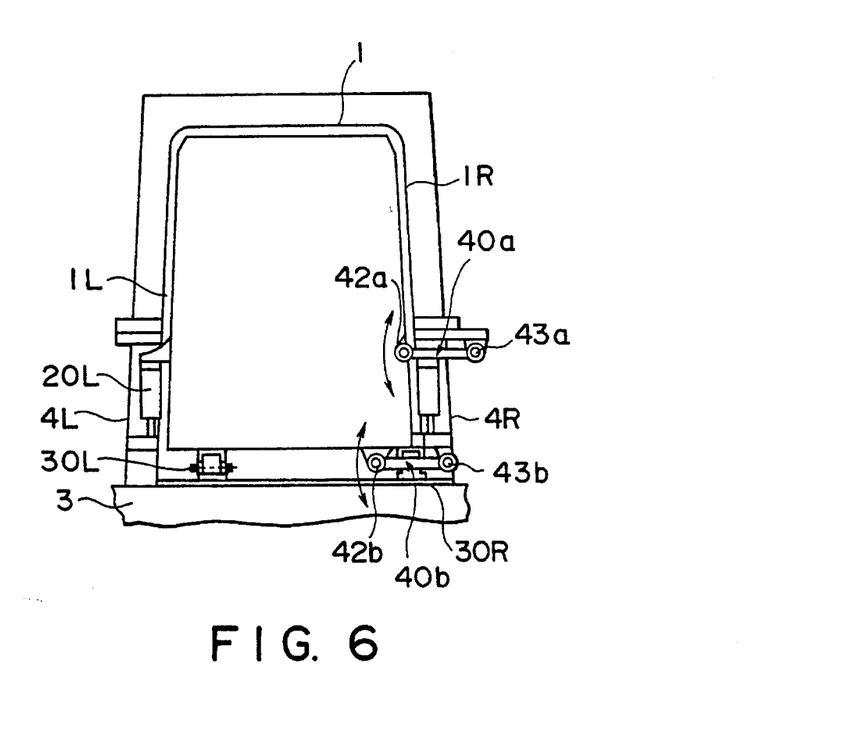
FIG. 6 is a rear view of the vibration damping supporting structure shown in FIG. 5.
Figure 7:
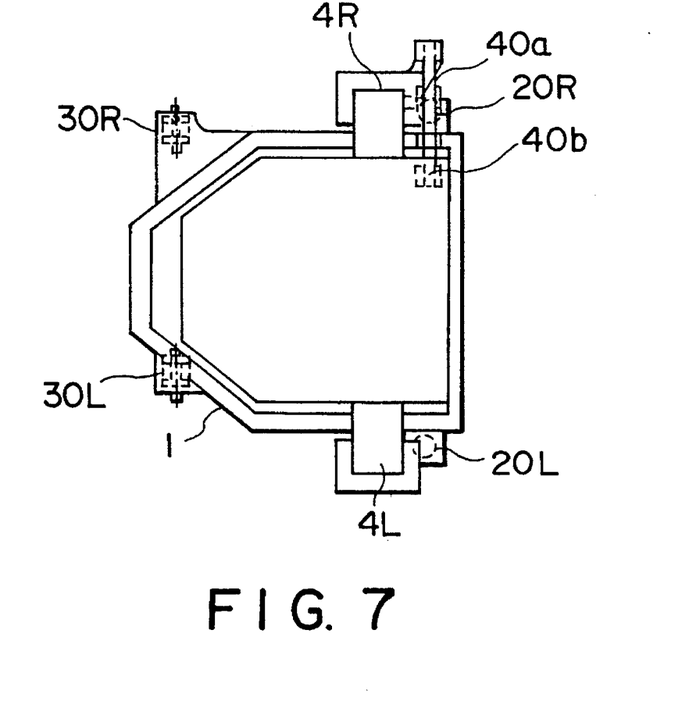
FIG. 7 is a plan view of the vibration damping supporting structure shown in FIG. 5.

A second embodiment of the invention is described with reference to FIGS. 5 through 8. Elements in these figures which are the same as in FIG. 1 have been given the same reference numerals, and a detailed description thereof is not repeated. As shown in FIGS. 5 through 7, each of the right and left side portions of a front portion of the cabin 1 is rotatably supported by a rotatable supporting member 30R or 30L, respectively, secured to the frame 3. Each of the right and left side portions of a rear portion of the cabin 1 is supported by the suspension cylinders 20R and 20L, respectively. A bracket 4R, which is secured to and extends generally upwardly from the frame 3, is connected to one side 1R of the cabin 1 through upper lateral rod 40a and lower lateral 40b. The lateral rods 40a and 40b are parallel to each other to form a four-bar parallel linkage with the bracket 4R and the cabin side 1R. Alternatively, the other side 1L of the cabin 1 and a bracket 4L, secured to and extending upwardly from the frame 3, can be connected to each other through the lateral rods 40a and 40b.

Figure 8:
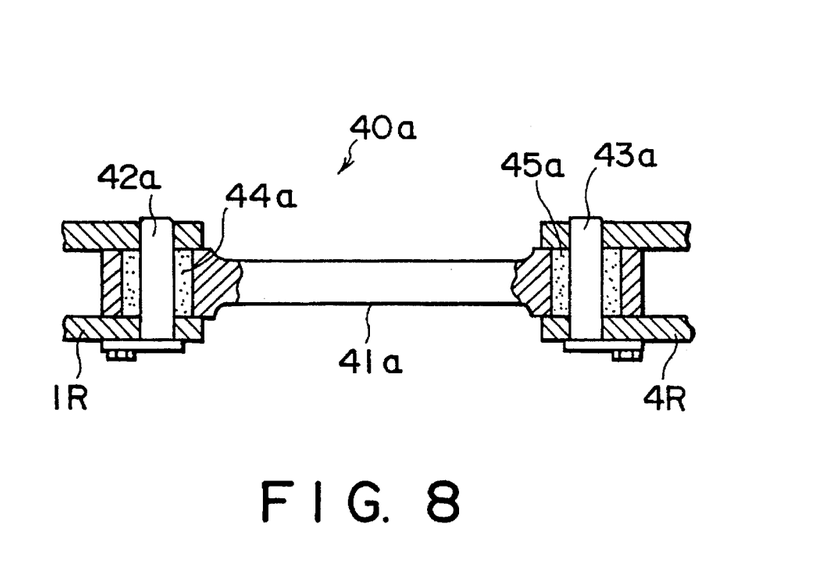
FIG. 8 is an enlarged sectional view of a lateral rod shown in FIG. 5.

The structure of the lateral rod 40a is illustrated in FIG. 8, wherein one end of the rod 41a is rotatably mounted to the cabin member 1R by pivot pin 42a. The other end of rod 41a is rotatably mounted to the bracket 4R by the pivot pin 43a. An annular elastic bushing 44a is positioned about pivot pin 42a so as to be interposed between the rod 41a and the pivot pin 42a. Likewise, an annular elastic bushing 45a is positioned about pivot pin 43a so as to be interposed between the rod 41a and the pivot pin 43a. The elastic bushings 44a and 45a can be formed of rubber or other suitable elastic material. The structure of the lateral rod 40b is similar to that of lateral rod 40a, such that FIG. 6 would be an illustration of lower lateral rod 40b if the reference numeral suffix "a" were replaced by the suffix "b".

The operation of the second embodiment is as follows. When the cabin 1 moves upwardly and downwardly as a result of extension and contraction of the suspension cylinders 20L and 20R, the lateral rods 40a and 40b rotate in a direction depicted by the associated arrow in FIG. 6, drawing a circular arc around the pivot pins 43a and 43b, respectively. Since the lateral rods 40a and 40b, together with the bracket 4R and the cabin side 1R, form the four-bar parallel linkage, the rear portion of the cabin 1 is permitted to readily move upwardly and downwardly in the vertical direction so that the cabin 1 pivots about the pivot axis formed by the rotatable supporting members 30R and 30L, while lateral motion of the cabin 1 is minimized. In addition, the elastic bushings 44a and 45a on the lateral rod 40a and the elastic bushings 44b and 45b on the lateral rod 40b make it possible to absorb the vibration transmitted from the frame 3 as well as a slight transversal force caused as a result of the movement drawing the circular arc.

Accordingly, even the large impact and shock upon the equipment passing over a large rock or the like can be absorbed by the large stroke of the suspension cylinders 20L and 20R, along with the slight or weak vibrations. In addition, the lateral rods 40a and 40b effectively prevent the cabin 1 from being oscillated laterally, which improves the riding quality and minimizes the possibility of deteriorated working efficiency due to fatigue. Further, the dampening of the vibrations does not result in cracks and failures in the cabin 1.

The oscillation of the cabin about a pivot axis through the front mounts 10R and 10L or 30R and 30L minimizes the effect of the oscillation on the operator's vision as contrasted with a situation wherein the cabin would be oscillated about a pivot axis through the rear mounts.

It should be understood that the present invention is not limited to the particular embodiments illustrated and described herein, and various changes and modifications can be made without departing from the spirit and scope of the appended claims. For example, an additional front mount could be located at the center portion of the front portion of the cabin. Similarly, the front mounts could be mounted between lateral extensions of the cabin and the frame rather than directly under the cabin floor. The four-bar parallel linkage of the second embodiment could be utilized in the first embodiment.

We claim:

1. In a construction equipment having a frame, an operator cabin, and a supporting structure positioned between the operator cabin and the frame for mounting the operator cabin on the frame and for absorbing and dampening vibrations traveling from the frame to the operator cabin, the improvement wherein the supporting structure comprises a damper plate shock absorber located at a right side portion of a front portion of the operator cabin, a damper plate shock absorber located at a left side portion of the front portion of the operator cabin, a spring biased hydraulic shock absorber located at a right side portion of a rear portion of the operator cabin, and a spring biased hydraulic shock absorber located at a left side portion of the rear portion of the operator cabin, each of said spring biased hydraulic shock absorbers having a stroke which is significantly larger than a corresponding stroke of said damper plate shock absorbers, whereby when said equipment is vibrated upwardly and downwardly by a strong shock in a vertical direction, said spring biased hydraulic shock absorbers located at said rear portion of said operator cabin contract and extend at a higher degree than the damper plate shock absorbers located at said front portion of said operator cabin such that said operator cabin oscillates back and forth about a pivot axis with said damper plate shock absorbers serving as said pivot axis.

2. A construction equipment as claimed in claim 1, wherein each damping plate shock absorber comprises a guide shaft joined to a case through an elastic material, said guide shaft having first and second ends, one of the case and the first end of the guide shaft being secured to the frame with the other of the case and the first end of the guide shaft being secured to the cabin, the second end of the guide shaft having a damper plate attached thereto, the damper plate being contained in a fluid enclosing chamber in the case along with a highly viscous fluid.

3. A construction equipment as claimed in claim 2, wherein each of the spring biased hydraulic shock absorbers comprises a cylinder and a piston rod, the piston rod having an inner end and a distal end, the cylinder containing a piston chamber, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the inner end of the piston rod extends, and a spring biasing the piston rod in one direction, the cylinder having an attachment end and a piston end, one of the attachment end of the cylinder and the distal end of the piston rod being attached to the operator cabin and the other of the attachment end of the cylinder and the distal end of the piston rod being attached to the frame.

4. A construction equipment as claimed in claim 1, wherein each damping plate shock absorber comprises a guide shaft joined to a case through an elastic material, said guide shaft having first and second ends, the case being tightly attached to the frame, the first end of the guide shaft being tightly attached to the operator cabin, the second end of the guide shaft having a damper plate tightly attached thereto, the damper plate being contained in a highly viscous fluid positioned in a fluid enclosing chamber of the case.

5. A construction equipment as claimed in claim 4, wherein each of the spring biased hydraulic shock absorbers comprises a cylinder and a piston rod, the piston rod having an inner end and a distal end, the cylinder containing a piston chamber, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the inner end of the piston rod extends, the cylinder having an attachment end and a piston end, the attachment end of the cylinder being attached to the operator cabin and the distal end of the piston rod being attached to the frame, and a spring positioned in said piston chamber biasing the piston rod toward the frame.

6. A construction equipment as claimed in claim 1, wherein each damping plate shock absorber is positioned on the frame directly below the cabin and comprises a guide shaft joined to a case through an elastic material, said guide shaft having an upper end and a lower end, the case being tightly attached to the frame, the upper end of the guide shaft being tightly attached to the operator cabin, the lower end of the guide shaft having a damper plate tightly attached thereto, the damper plate being contained in a highly viscous fluid positioned in a fluid enclosing chamber of the case.

7. A construction equipment as claimed in claim 6, wherein each of the spring biased hydraulic shock absorbers comprises a cylinder and a piston rod, the piston rod having an upper end and a lower end, the cylinder containing a piston chamber having a generally vertically extending longitudinal axis, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the upper end of the piston rod extends, the cylinder having an attachment end and a piston end, the attachment end of the cylinder being attached to the operator cabin and the lower end of the piston rod being attached to the frame, and a spring positioned in said piston chamber biasing the piston rod downwardly toward the frame.

8. A construction equipment as claimed in claim 7, wherein the attachment end of the cylinder is attached to the cabin by a bolt which extends through a first annular plate, a first spacer, and a second annular plate into the attachment end of the cylinder; the first spacer being positioned in an opening through a member of the cabin, with the diameter of the first spacer being less than the diameter of the opening through the member of the cabin; a first resilient member being positioned between the first spacer and the member of the cabin and between the member of the cabin and each of the first and second annular plates; and wherein the lower end of the piston rod extends through a first nut, a third annular plate, a second spacer, a fourth annular plate, and a second nut; the second spacer being positioned in an opening through a member of the frame, with the diameter of the second spacer being less than the diameter of the opening through the member of the frame; a second resilient member being positioned between the second spacer and the member of the frame and between the member of the frame and each of the third and fourth annular plates.

9. A construction equipment as claimed in claim 1, wherein each of the spring biased hydraulic shock absorbers comprises a cylinder and a piston rod, the piston rod having an inner end and a distal end, the cylinder containing a piston chamber, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the inner end of the piston rod extends, and a spring biasing the piston rod in one direction, the cylinder having an attachment end and a piston end, one of the attachment end of the cylinder and the distal end of the piston rod being attached to the operator cabin and the other of the attachment end of the cylinder and the distal end of the piston rod being attached to the frame.

10. A construction equipment as claimed in claim 1, wherein each of the spring biased hydraulic shock absorbers comprises a cylinder and a piston rod, the piston rod having an inner end and a distal end, the cylinder containing a piston chamber, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the inner end of the piston rod extends, the cylinder having an attachment end and a piston end, the attachment end of the cylinder being attached to the operator cabin and the distal end of the piston rod being attached to the frame, and a spring positioned in said piston chamber biasing the piston rod toward the frame.

11. In a construction equipment having a frame, an operator cabin, and a supporting structure positioned between the operator cabin and the frame for mounting the operator cabin on the frame and for absorbing and dampening vibrations traveling from the frame to the operator cabin, the improvement wherein the supporting structure comprises a first supporting member located at a right side portion of a front portion of the operator cabin, a second supporting member located at a left side portion of the front portion of the operator cabin, a spring biased hydraulic shock absorber located at a right side portion of a rear portion of the operator cabin, a spring biased hydraulic shock absorber located at a left side portion of the rear portion of the operator cabin, a bracket fixed to the frame adjacent one side of the operator cabin, the bracket and the adjacent one side of the operator cabin being so connected to each other to form a four-bar parallel linkage with an upper lateral rod and a lower lateral rod disposed as upper and lower portions of the parallel linkage.

12. A construction equipment as claimed in claim 11, wherein a first end of the upper lateral rod is rotatably mounted to the cabin by a first pivot pin and a second end of the upper lateral rod is rotatably mounted to the bracket by a second pivot pin, and wherein a first end of the lower lateral rod is rotatably mounted to the cabin by a third pivot pin and a second end of the lower lateral rod is rotatably mounted to the bracket by a fourth pivot pin.

13. A construction equipment as claimed in claim 12, wherein a first elastic bushing is interposed between the first end of the upper lateral rod and the first pivot pin, a second elastic bushing is interposed between the second end of the upper lateral rod and the second pivot pin, a third elastic bushing is interposed between the first end of the lower lateral rod and the third pivot pin, and a fourth elastic bushing is interposed between the second end of the lower lateral rod and the fourth pivot pin.

14. A construction equipment as claimed in claim 11, wherein each of said first supporting member and said second supporting member is a rotatable supporting member such that the cabin can pivot about a pivot axis formed by the rotatable supporting members, while lateral motion of the cabin is minimized by the four-bar parallel linkage.

15. A construction equipment as claimed in claim 14, wherein a first end of the upper lateral rod is rotatably mounted to the cabin by a first pivot pin and a second end of the upper lateral rod is rotatably mounted to the bracket by a second pivot pin, and wherein a first end of the lower lateral rod is rotatably mounted to the cabin by a third pivot pin and a second end of the lower lateral rod is rotatably mounted to the bracket by a fourth pivot pin.

16. A construction equipment as claimed in claim 15, wherein a first elastic bushing is interposed between the first end of the upper lateral rod and the first pivot pin, a second elastic bushing is interposed between the second end of the upper lateral rod and the second pivot pin, a third elastic bushing is interposed between the first end of the lower lateral rod and the third pivot pin, and a fourth elastic bushing is interposed between the second end of the lower lateral rod and the fourth pivot pin.

17. A construction equipment as claimed in claim 16, wherein each of the spring biased hydraulic shock absorbers comprises a cylinder and a piston rod, the piston rod having an inner end and a distal end, the cylinder containing a piston chamber, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the inner end of the piston rod extends, and a spring biasing the piston rod in one direction, the cylinder having an attachment end and a piston end, one of the attachment end of the cylinder and the distal end of the piston rod being attached to the operator cabin and the other of the attachment end of the cylinder and the distal end of the piston rod being attached to the frame.

18. A construction equipment as claimed in claim 16, wherein each of the spring biased hydraulic shock absorbers comprises a cylinder and a piston rod, the piston rod having an inner end and a distal end, the cylinder containing a piston chamber, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the inner end of the piston rod extends, the cylinder having an attachment end and a piston end, the attachment end of the cylinder being attached to the operator cabin and the distal end of the piston rod being attached to the frame, and a spring positioned in said piston chamber biasing the piston rod toward the frame.

19. A construction equipment as claimed in claim 11, wherein each of the spring biased hydraulic shock absorbers comprises a cylinder and a piston rod, the piston rod having an upper end and a lower end, the cylinder containing a piston chamber having a generally vertically extending longitudinal axis, the piston chamber being divided into first and second oil chambers which are separated from each other by a piston fixedly secured to the piston rod, the piston rod and piston being positioned within and coaxial to the piston chamber for reciprocating motion along the longitudinal axis of the piston chamber, the piston having at least one orifice extending therethrough to provide restricted communication between the first and second oil chambers, the cylinder being provided with a gas chamber into which the upper end of the piston rod extends, the cylinder having an attachment end and a piston end, the attachment end of the cylinder being attached to the operator cabin and the lower end of the piston rod being attached to the frame, and a spring positioned in said piston chamber biasing the piston rod downwardly toward the frame.

20. A construction equipment as claimed in claim 19, wherein the attachment end of the cylinder is attached to the cabin by a bolt which extends through a first annular plate, a first spacer, and a second annular plate into the attachment end of the cylinder; the first spacer being positioned in an opening through a member of the cabin, with the diameter of the first spacer being less than the diameter of the opening through the member of the cabin; a first resilient member being positioned between the first spacer and the member of the cabin and between the member of the cabin and each of the first and second annular plates; and wherein the lower end of the piston rod extends through a first nut, a third annular plate, a second spacer, a fourth annular plate, and a second nut; the second spacer being positioned in an opening through a member of the frame, with the diameter of the second spacer being less than the diameter of the opening through the member of the frame; a second resilient member being positioned between the second spacer and the member of the frame and between the member of the frame and each of the third and fourth annular plates.

* * * * *